July 24, 1923.

M. STADTLER

SPRING MOUNTING

Filed Sept. 14, 1922

Inventor:
Mathias Stadtler
By Cheever & Cox Attys.

Patented July 24, 1923.

1,462,990

UNITED STATES PATENT OFFICE.

MATHIAS STADTLER, OF CHICAGO, ILLINOIS.

SPRING MOUNTING.

Application filed September 14, 1922. Serial No. 588,125.

*To all whom it may concern:*

Be it known that I, MATHIAS STADTLER, a citizen of the United States, residing at Chicago, in the county of Cook and State of Illinois, have invented a certain new and useful Improvement in Spring Mountings, of which the following is a specification.

My invention relates to spring structures, especially for beds, couches and the like. In a previous Patent, No. 1,364,329, I have shown a structure in which approximately helical springs are mounted on cross strips—especially strips made of resilient corrugated sheet metal. In that case I showed a sheet metal clip for securing the spring to the strip but the type of clip there shown left something to be desired. Being punched from sheet metal it used more material than was desirable, and being bendable, it required a certain amount of manipulation during assembly, which I have since found may be reduced by employing my present invention. My present purpose is to provide a clip formed of spring wire which may be completely configurated before use, that is, performed, by machine or otherwise, and which will effect a saving in material and also in the amount of time and labor involved in assembly.

I accomplish my objects by the mechanism illustrated in the accompanying drawings, in which—

Like numerals denote like parts throughout the several views.

In the form illustrated there is a coiled upholstery spring of usual form. These are approximately helical and, as usual, are of spring wire. This coiled spring rests upon two cross strips 2, which by preference are of corrugated spring sheet metal as shown in my previous patent. By employing these corrugated sheet metal springs the bed or upholstery has the advantage both of the resilience of the coiled spring and of the strips.

Figure 2:
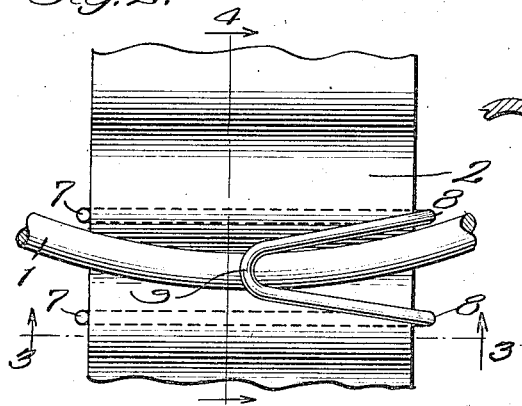
Figure 2 is an enlarged detail showing the seating of the coil upon the supporting strip and the attaching clip in position.
Figure 4:
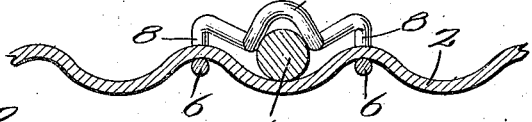
Figure 4 is a section on the line 4—4 Figure 2.
Figure 3:
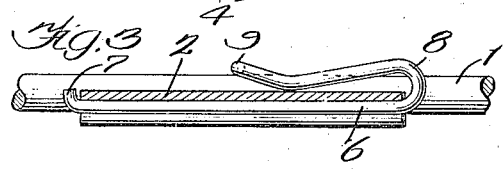
Figure 3 is a section on the line 3—3 Figure 2.
Figure 5:
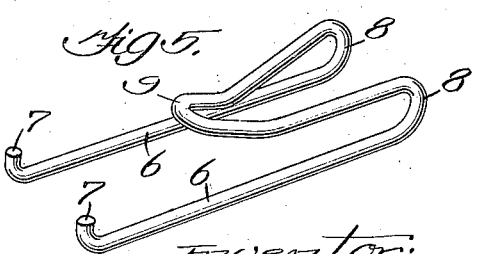
Figure 5 is a perspective view of the clip.

Now referring to the new type of clip which I employ to secure the parts together; this has two parallel prongs 6 adapted to lie on the under side of the strip and seat in the channels or depressions formed therein as a result of the corrugating. At the free end these prongs have upturned fingers 7, which engage the edge of the strip and prevent the clip from shifting toward the right, Figures 2 and 3. The clip has two bends 8 adapted to pass up and around the opposite edge of the strip for preventing the clip from shifting toward the left, Figures 2 and 3. The clip has a third bend 9 which unites the two branches, thus making the clip a single unitary structure. It is desirable to configurate the upper portion of the clip in the manner illustrated, in which the bend 9 rests upon the top of the spring wire 1 and thence passes downward to the two sides of the wire to prevent lateral movement thereof and hold it firmly seated in the intermediate corrugation. The bend 9 may be in actual contact with the upper surface of the wire as shown in Figure 3 or slightly out of contact as shown in Figure 4. In the latter case, however, the clip passes obliquely to the two sides of the spring wire and holds it "wedged," as it were, in place.

Figure 1:
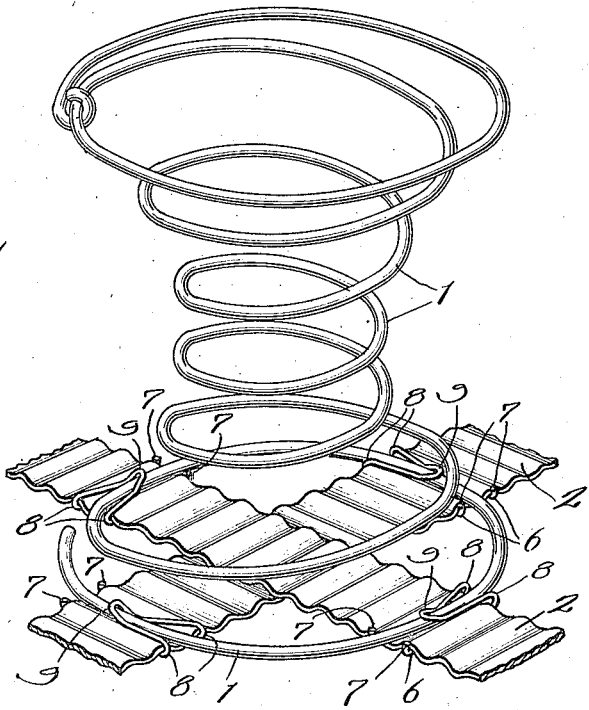
Figure 1 is a perspective view of the assembled structure.

In practice, when it is desired to assemble the parts, the spring strips 2 are first fastened in place in any suitable supporting frame (not shown), said strips crossing each other at right angles as illustrated in Figure 1, the coiled springs are then placed at the points of intersection of the cross strips, whereupon the structure is ready to have the spring clips applied. The applying of the clips is a simple matter, the prongs 6 being first passed down on either side of the turn of wire, and the clip then being tilted so as to bring the prong 6 into contact with the under side of the strip and the fingers 7 into engagement with the far edge of the strip. When this has been done the clip seats in the manner illustrated, the center bend 9 overlying the turn of the spring wire and the wire of the clip thence passing to the two sides of the spring wire and confining it laterally and at the same time holding it firmly seated in the depression of the strip.

I have found that in many cases two clips are sufficient for holding the spring in position, one clip being applied to each of the cross strips. For safety, however, it is desirable to employ four clips—one at each point where the coiled spring seats upon the cross strips as illustrated in Figure 1. The time, labor and expense involved in thus using four clips is so slight that it is desirable in most cases to use four instead of two. In either event, however, the parts will be firmly held assembled and the contact is so close that there will be no rattling of the component parts.

My new clip presents a neat appearance and may be completely preformed. In other words, it may be completely configurated to its final form upon machines made for the purpose; consequently when finished no handwork or bending is necessary as was the case with the clip shown in my aforesaid issued patent. The present structure is, therefore, simplified and the expense both of the material and time of assembly are considerably reduced.

Having thus described my invention, what I claim as new and desire to secure by Letters Patent is:—

1. A spring structure having a coiled spring, a supporting strip beneath it and a clip formed of resilient wire, said clip having a central bend adapted to hold the end turn of the spring in contact with one surface of the strip, said clip also having integral prongs adapted to engage the opposite surface of the strip and having short upturned fingers adapted to be sprung into engagement with the edge of the strip.

2. A spring structure having a supporting strip, a coiled spring having its end turn seating upon said strip, and a completely preformed clip configurated from a single piece of spring wire having a bend adapted to overlie the spring to hold it in contact with the strip, the clip passing down around one edge of the strip and having prongs adapted to engage the lower surface of the strip, said prongs having short fingers at the free ends adapted to be sprung into engagement with the far edge of the strip.

3. A spring structure having a corrugated, resilient supporting strip, a coiled spring having its end turn seating in depressions of said strip, and a completely preformed clip made from a single piece of spring wire, the clip having a central bend adapted to overlie the end turn of the coiled spring and having oblique sides adapted to frictionally engage it, the clip passing around one edge of the strip to the under side and there having prongs adapted to seat in the depressions of adjacent corrugations, and means for preventing the clip from shifting crosswise of the strip.

4. A spring structure having corrugated resilient cross strips, a coiled spring having its end turn seating in depressions of said strips, and a completely preformed clip made from a single piece of spring wire, the clip having a central bend adapted to overlie the end turn of the coiled spring and having oblique sides adapted to frictionally engage it, the clip having bends adapted to enclose one edge of the engaged supporting strip on either side of the wire of the coiled spring, the clip having prongs adapted to seat in the depressions of adjacent corrugations on the under side of the strip and having short fingers adapted to be sprung into engagement with the far edge of the strip.

In witness whereof, I have hereunto subscribed my name.

MATHIAS STADTLER.